United States Patent
Kamler (10) Patent No.: US 11,066,115 B2
(45) Date of Patent: Jul. 20, 2021

(54) TRAINING WHEEL SYSTEM

(71) Applicant: Kent International Inc., Parsippany, NJ (US)

(72) Inventor: Scott Kamler, Morristown, NJ (US)

(73) Assignee: Kent International Inc., Fairfield, NJ (US)

(*) Notice: Subject to any disclaimer, the term of this patent is extended or adjusted under 35 U.S.C. 154(b) by 323 days.

(21) Appl. No.: 16/375,581

(22) Filed: Apr. 4, 2019

(65) Prior Publication Data

US 2020/0317281 A1    Oct. 8, 2020

(51) Int. Cl.
*B62H 1/12*    (2006.01)

(52) U.S. Cl.
CPC .................................. *B62H 1/12* (2013.01)

(58) Field of Classification Search
CPC ...... B62H 1/12; B62H 7/00; B62B 2202/031; B62B 2205/10; B60B 33/0042
USPC ......................................................... 280/293
See application file for complete search history.

(56) References Cited

U.S. PATENT DOCUMENTS

| | | | | |
|---|---|---|---|---|
| 3,642,305 A | * | 2/1972 | Pawsat | B62H 1/12 280/293 |
| 5,707,069 A | | 1/1998 | Plana | |
| 6,010,306 A | * | 1/2000 | Bucher | F04D 25/088 416/210 R |
| 6,113,122 A | | 9/2000 | Plana | |
| 6,709,000 B1 | * | 3/2004 | Blake | B62H 1/12 280/293 |
| 7,537,229 B1 | * | 5/2009 | Wu | B62H 1/12 280/205 |
| 2018/0237097 A1 | * | 8/2018 | Blake | B62K 15/00 |
| 2020/0156723 A1 | * | 5/2020 | Booker, Jr. | B62H 1/12 |

OTHER PUBLICATIONS

EHowFitness, Bicycle Equipment: How to Attach Bicycle Training Wheels,Oct. 2019, https://www.youtube.com/watch?v=n2sTs3k9G-U (Year: 2019).*

Assembling Kid's Bikes, Jul. 2, 2017, [online]. Retrieved from the Internet: <URL: https://web.archive.org/web/20170702091413/https://dadand.com/assembling-kids-bikes > on Aug. 5, 2020, 15 pages.

* cited by examiner

*Primary Examiner* — Minnah L Seoh
*Assistant Examiner* — Sophia Marie McGuire
(74) *Attorney, Agent, or Firm* — Fitch, Even, Tabin & Flannery, LLP (57) ABSTRACT

A training wheel system is provided that can improve packaging, shipping, and installation. The training wheel system includes a bracket for maintaining the orientation of a training wheel arm. In one form, the bracket can nest within a channel of a portion of the training wheel arm.

14 Claims, 8 Drawing Sheets

TRAINING WHEEL SYSTEM

FIELD

The application generally relates to a training wheel system for coupling to a bicycle and, in more particular applications, to a training wheel system that may be easily coupled to an axle of a bicycle.

BACKGROUND

Training wheel systems have been available for a number of years to provide younger and inexperienced riders additional stability when riding a bicycle. However, there are a variety of complications and/or difficulties associated with shipping a bicycle that includes a training wheel assembly. If the training wheel system is pre-installed, packaging the overall bicycle can be difficult, and if the training wheel system is not pre-installed, installation can be difficult and tedious.

If the training wheel system is preassembled on the bicycle, the bicycle and packaging will be much wider than without the training wheels, and if not properly packaged can damage the training wheels. For example, training wheels extend outward from the bicycle and can become caught on things in shipping such that they become disformed or even break off. If the package containing the bicycle with training wheels is dropped or mishandled, the training wheels can become bent or otherwise disformed and defective. Additional packaging required to prevent these problems can be employed, although it is not desirable due to the increased cost associated with the additional packaging measures.

Alternatively, the training wheel system can be shipped uninstalled from the bicycle. In this regard, it is desirable that the end user does not have to significantly assemble the bicycle and that the bicycle comes substantially preassembled. Reducing the assembly required for the end user reduces the risk of improper construction and the potential injury that could occur as a result. Many end users do not desire to assemble the product but prefer to be able to use the product upon purchase or delivery.

SUMMARY

The present disclosure provides a solution to the problem by providing a training wheel system that is easily installed, requiring minimal labor. Additionally, the shipping problems are resolved since the training wheels are not attached to the bicycle during shipping. The disclosure provides a training wheel system wherein the user takes the training wheel arm, slides it over a fastener on the axle, and tightens the fastener. In one form, no other assembly, alignment, or orientation may be required.

The present disclosure relates to a training wheel system for coupling to an axle of the bicycle. The system comprises a training wheel arm with a first end and a second end. The first end defines a first opening and an elongated slot extending from the first opening. The first opening has a width that allows it to fit over a fastener on the axle of a bicycle while the elongated slot has a width narrower than the width of the fastener. The first end is placed next to a bracket so that an interior portion of the first end contacts an exterior portion of the bracket. The second end couples to a wheel.

According to one form, a training wheel system is provided having a bracket, a training wheel arm, and a fastener system. The bracket has a length and an external width where the bracket is configured for placement adjacent a frame of the bicycle. The training wheel arm has a first end portion and a second end portion where the first end portion configured to couple the training wheel arm to the bicycle and the second end portion configured to couple to a training wheel. The first end portion includes an interior surface having a width that is larger than and can be positioned about at least a portion of the bracket external width. The first end portion defines a first opening having a first width and an elongated slot extending from the first opening having a second width that is smaller than the first width. The fastener system has an outer width smaller than the first width and larger than the second width to permit the first opening to slide over the fastener and retain the first end portion at the elongated slot.

In one form, the bracket has an exterior surface that is generally U-shaped defined by a base and arms extending therefrom.

According to one form, the bracket further includes a protrusion extending from a portion of one of the arms, the protrusion configured for engaging a slot on a bicycle.

In accordance with one form, the interior surface of the first end portion of the training wheel arm has an interior surface that is generally U-shaped.

According to one form, the fastener system includes a flange.

In one form, the fastener system comprises a fastener and a washer.

In accordance with one form, the system further includes a cap to cover the first opening.

According to one form, the bracket defines an opening to receive an axle of the bicycle.

In one form, the training wheel arm is configured to be positioned such that at least a portion of the first end portion is located between the bracket and the fastener system.

These as well as other aspects, advantages, and alternatives, will become apparent to those of ordinary skill in the art by reading the following detailed description, with reference where appropriate to the accompanying drawings.

DETAILED DESCRIPTION

It should be appreciated that while the present application refers to a training wheel system for a bicycle, the training wheel system can be used on a variety of different systems, both motorized and non-motorized. Further, the training wheel system can be used with single-wheeled, two-wheeled, and/or other multi-wheeled structures. Therefore, the term bicycle should be understood to include all such structures and wheeled systems and not limited to a two wheeled, pedal driven structure.

Figure 1:
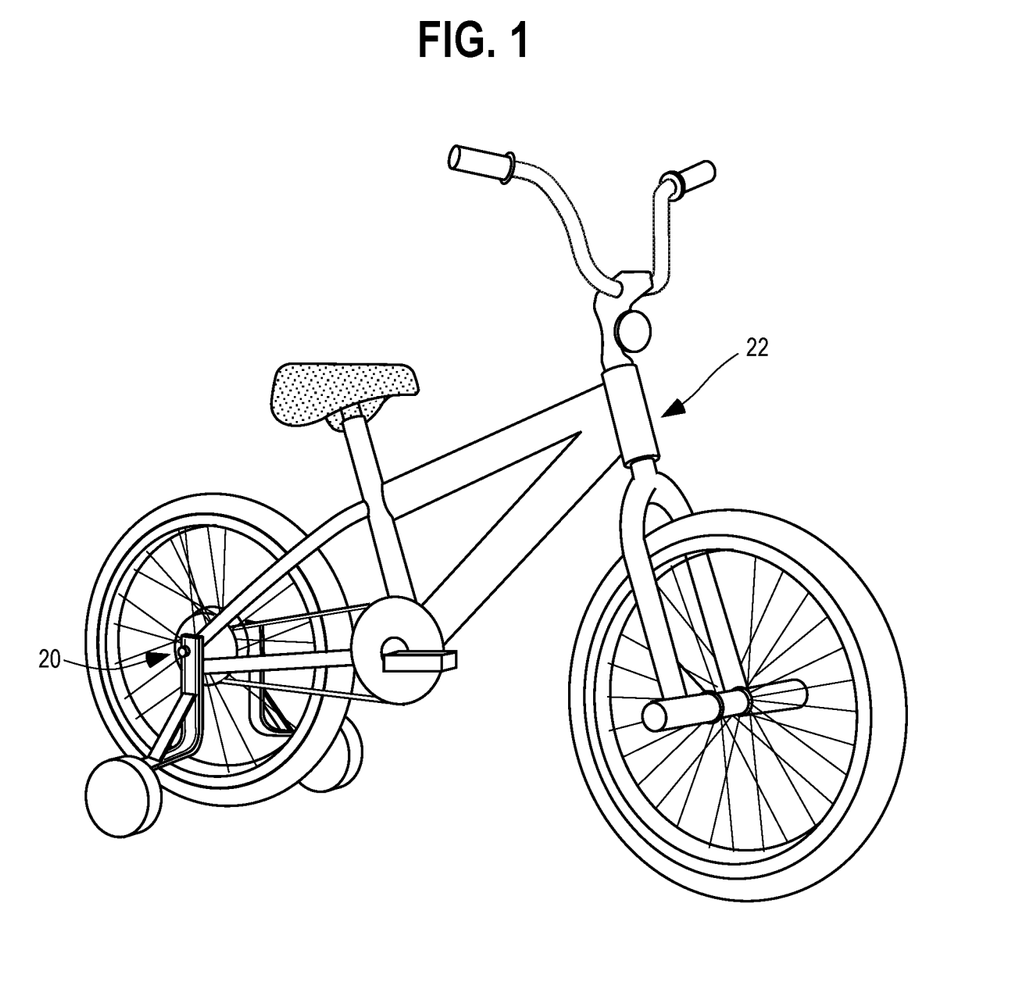
FIG. 1 is a perspective view of a training wheel system installed on a bicycle.

FIG. 1 illustrates one form of a training wheel system 20 installed on a two-wheeled bicycle 22. Generally, the training wheel system 20 can be installed on the bicycle 22 to help stabilize the bicycle and can be adjusted to provide more and/or less side-to-side pivoting of the bicycle, as desired.

Figure 2:
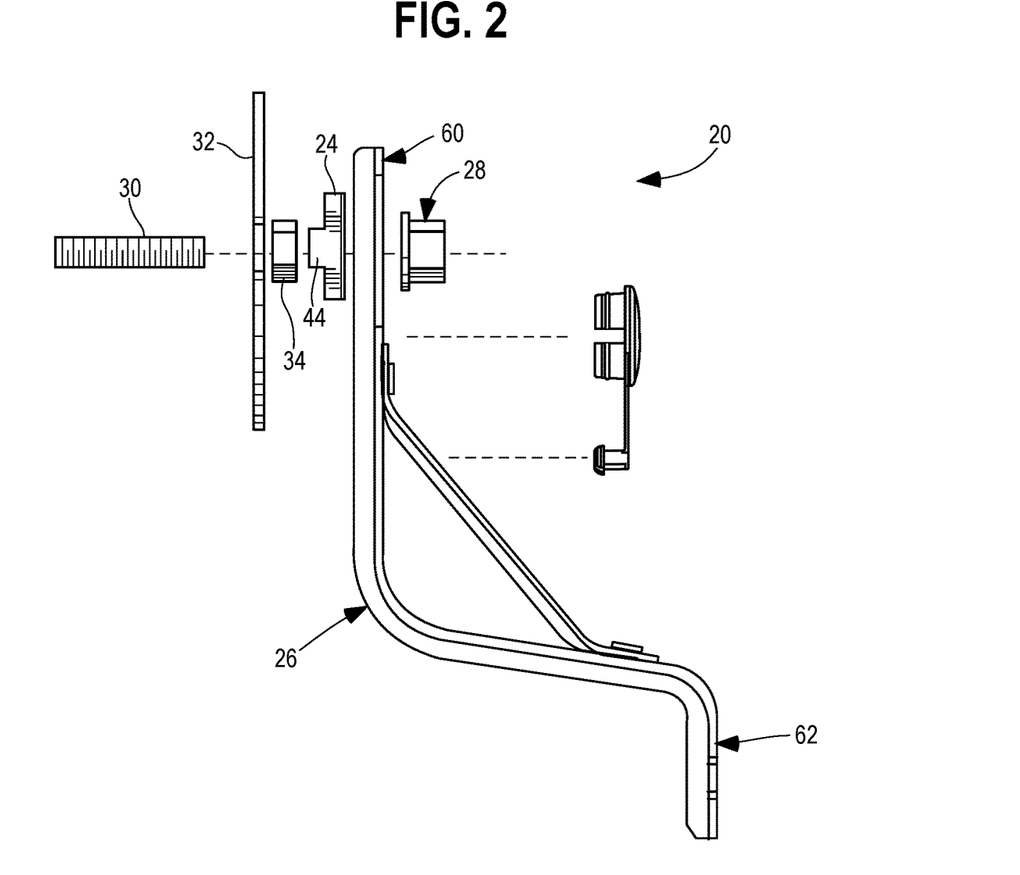
FIG. 2 is an exploded view of one form of a training wheel system.

Referring to FIG. 2, an exploded view of one form of the system 20 is illustrated. The system 20 may include a bracket 24, a training wheel arm 26, and a fastener system 28. In one form, as shown in FIG. 2, the system 20 can be installed onto the bicycle 22 using an axle 30 and frame 32 of the bicycle 22 and, optionally, a fastener 34, as will be discussed in more detail below.

Figure 5A:
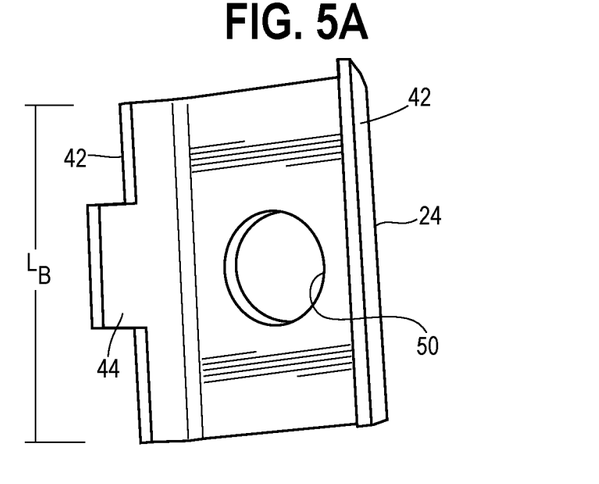
FIG. 5A is rear perspective view of a bracket.
Figure 5B:
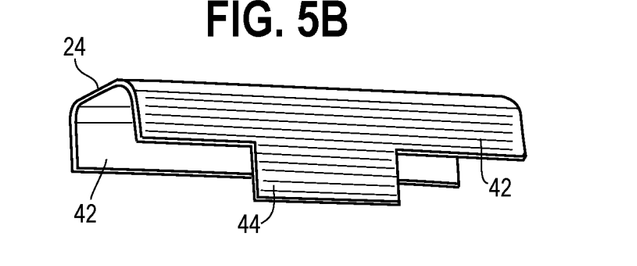
FIG. 5B is a side perspective view of the bracket of FIG. 5A.
Figure 5C:
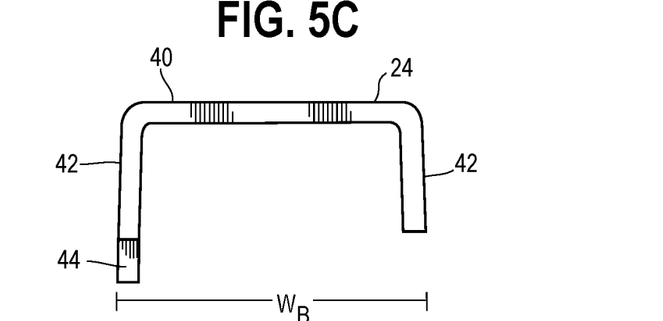
FIG. 5C is a top view of the bracket of FIG. 5A.
Figure 6:
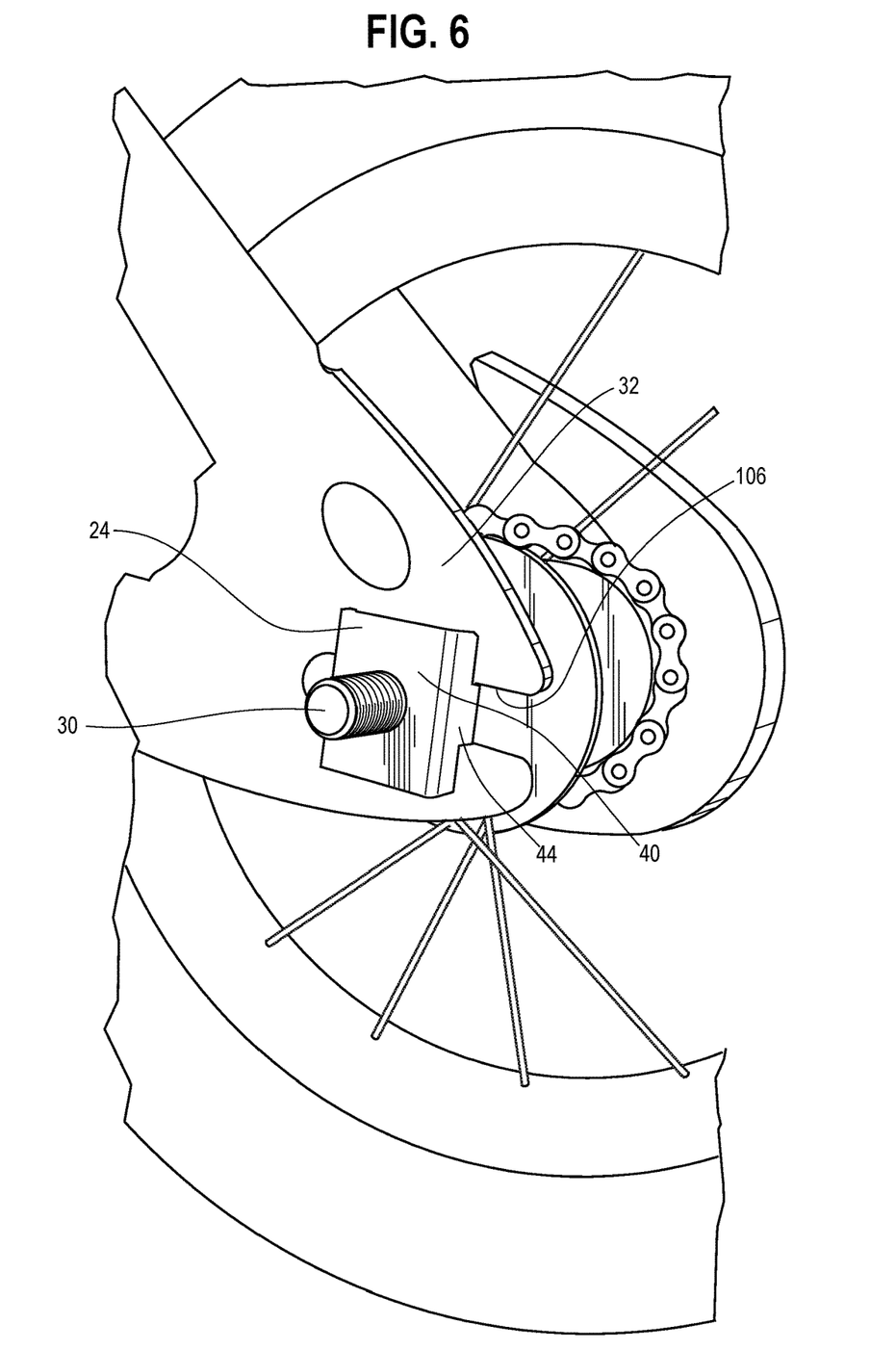
FIG. 6 is a perspective view of a bracket positioned on an axle against a frame of a bicycle.
Figure 7:
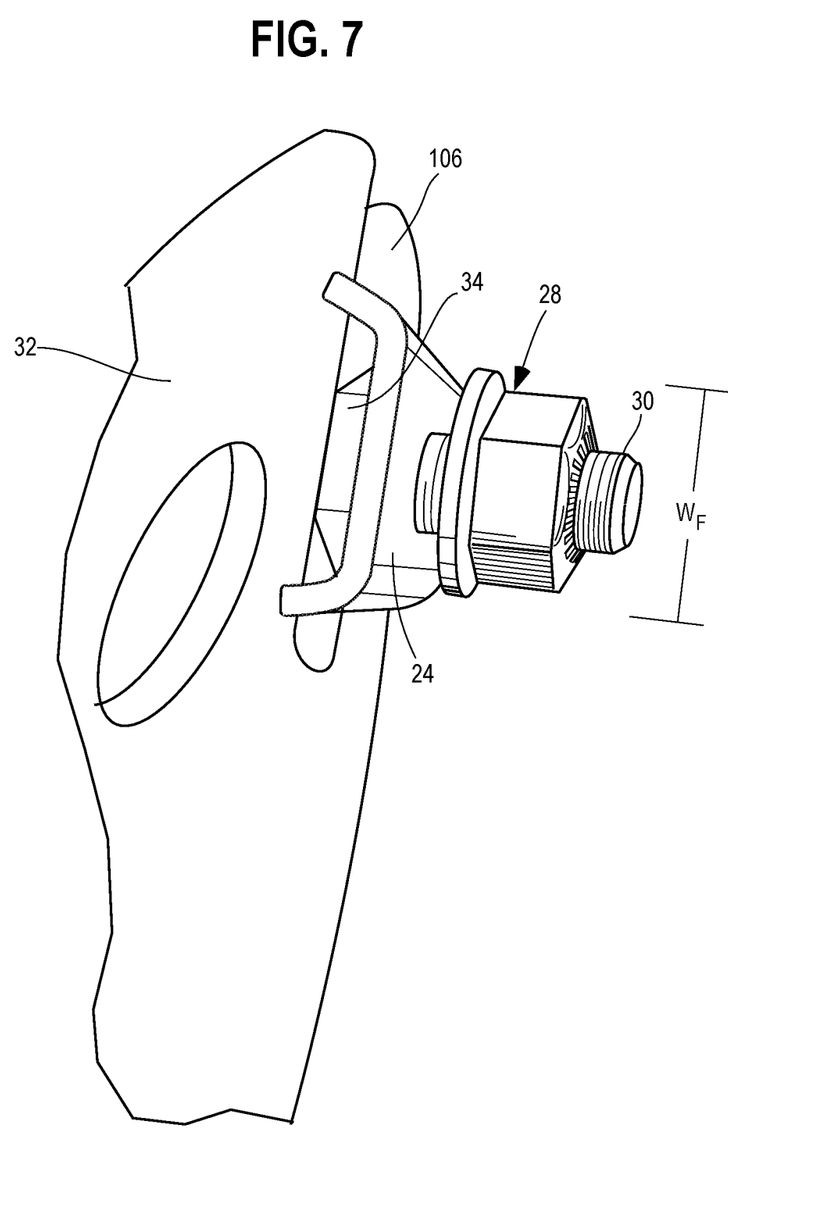
FIG. 7 is a perspective top view of a bracket and fastener installed on an axle of a bicycle.
Figure 8:
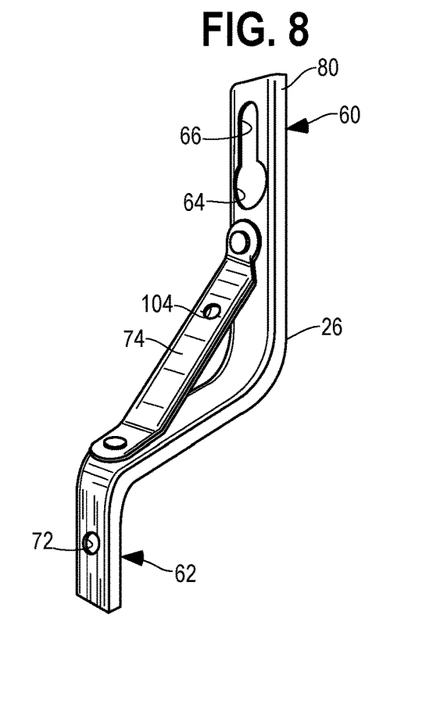
FIG. 8 is a perspective view of one form of a training wheel arm.
Figure 9:
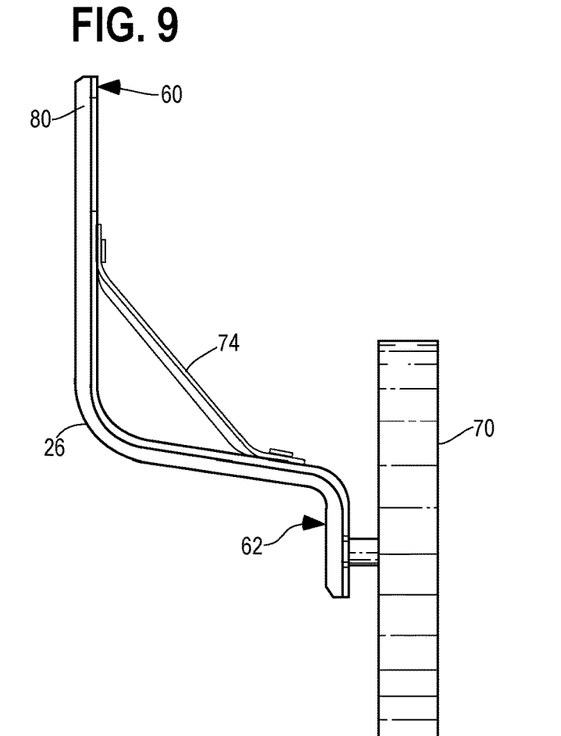
FIG. 9 is a side view of a training wheel arm including a training wheel.
Figure 10A:
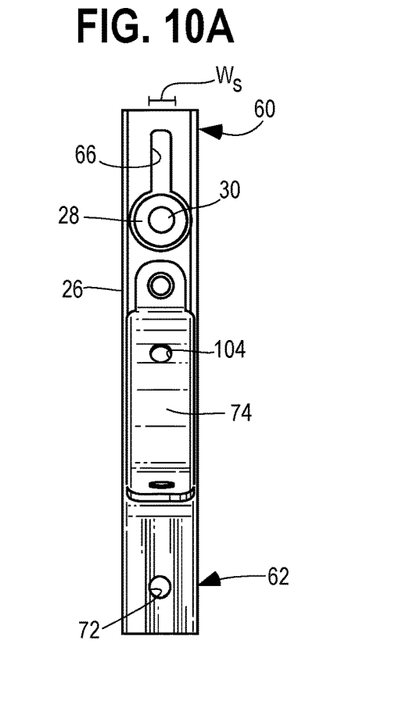
FIG. 10A is a front view of fastener extending through a first opening in the training wheel arm.
Figure 10B:
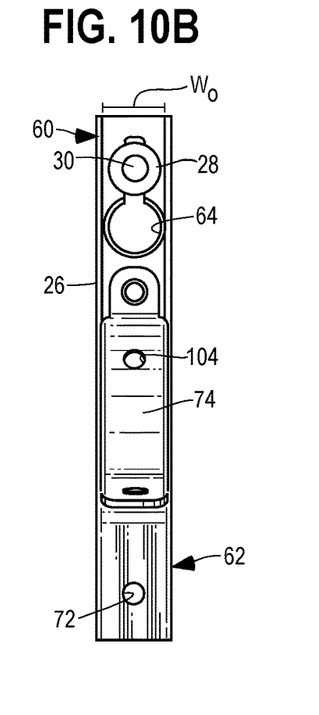
FIG. 10B is a front view of a fastener and axle sliding in a slot in the training wheel arm.

In one form, the bracket 24 has a length $L_B$ and an external width $W_B$. As shown in FIGS. 5A-5C, in one form, the bracket 24 includes a body portion 40 and at least one arm 42. The bracket 24 may also include a protrusion 44 extending from an arm 42. The protrusion 44 can be used to cooperate with the bicycle frame, as will be discussed in more detail below. The bracket 24 also defines an opening 50 whereby the axle 30 may pass therethrough. In one form, bicycles 22 can be shipped with the bracket 24 already installed thereon.

In one form, the bracket 24 may have a channel-type structure, as shown in FIGS. 5A-5C. In this regard, the cross-section of the structure can be generally C-shaped, generally U-shaped, rectangular shaped, and the like, such as seen in FIG. 5C. The bracket 24 may also take other shapes such that it fits within a portion of the training wheel arm 26 when installed. While shown as having curved corners where the body portion 40 meets the arm portions 42, it should be appreciated that the corners may also be more square or other shape, as desired.

In another form, the bracket 24 may not include arms, but instead could be a generally solid structure (not shown) having the protrusion 44 extending therefrom. In this form, the bracket 24 would still include an external width $W_B$, but would not necessarily have a channel-type structure.

The fastener system 28 may take a variety of forms, such as a flanged nut as shown in FIG. 2. Generally, the fastener system 28 may be used to maintain the training wheel arm 30 on the bicycle 22. As found in FIG. 3, the fastener system has an external width $W_F$ which can be used to cooperate with the training wheel arm 26, as will be discussed below with respect to assembly of the system 20. The fastener system can take a variety of forms including, but not limited to a nut, flanged nut, nut and washer, and the like. When a nut is used as part of the fastener system, the nut may be a nylon insert nut that resists turning, such as during shipping, when the bicycle is being ridden, and the like. In one form, bicycles 22 can be shipped with the fastener system 28 already on the axle 30 to help retain the bracket 24.

The training wheel arm 26 generally includes a first end portion 60 and a second end portion 62. The first end portion 60 has a first opening 64 and an elongated slot 66 extending from the first opening 64 which allows the training wheel arm 26 to be fastened to the bicycle 22. The first opening 64 has a width $W_O$ while the slot 66 has a width $W_S$ that is smaller than the width $W_O$. In one form, the width $W_O$ is larger than the width $W_F$ of the fastener system 28 such that the fastener system is permitted to pass through the opening 64. The width $W_S$ is smaller than the width $W_F$, preventing the fastener system 28 from passing through the slot 66. The slot 66 may also be configured to permit the axle 30 to be positioned throughout the slot 66 and thereby provide adjustability of the training wheel system 20 relative to the bicycle 20. The second end portion 62 can be configured to couple to a training wheel 70 such as via opening 72.

The training wheel arm 26 can take a variety of forms and shapes. In one form, the training wheel arm 26 can include a variety of bends such that the first and second end portions 60 and 62 extend along planes that are approximately parallel to one another. However, it should be appreciated that other shapes and configurations may also be included. Further, the training wheel arm 26 may also include a support 74 to provide additional strength and rigidity.

Figure 3:
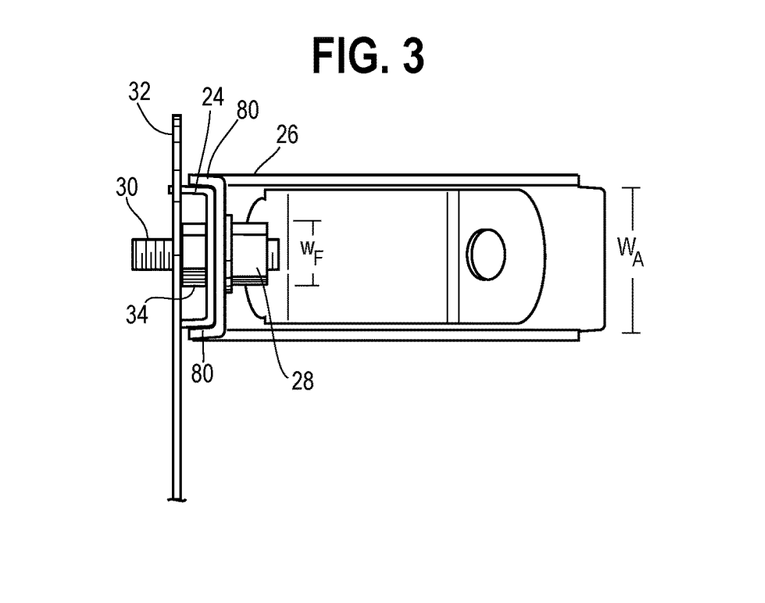
FIG. 3 is a top view of the training wheel system of FIG. 2 installed on an axle of a bicycle.
Figure 4:
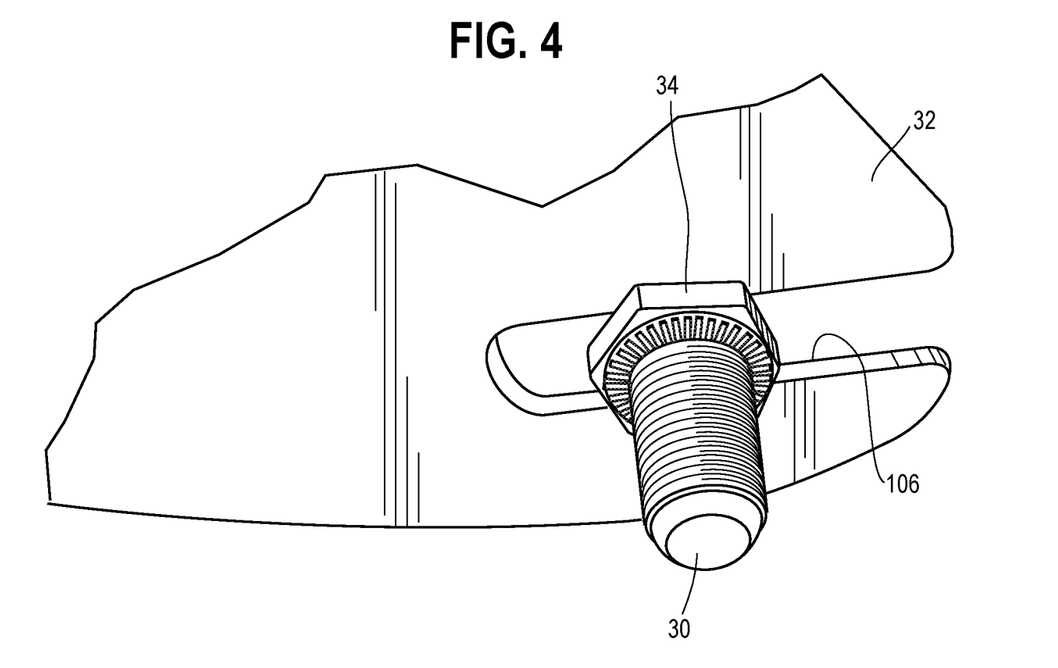
FIG. 4 is perspective view of an axle and fastener extending from the frame of a bicycle.

As seen in FIGS. 2 and 3, the first end portion 60 may have a generally channel like structure similar to the bracket 24. In this regard, in one form, the first end portion 60 may fit over the bracket 24 such that the bracket 24 generally nests in the first end portion 60. According to one form, the exterior shape of the bracket 24 generally corresponds to an interior shape of the first end portion 60 with the interior of the first end portion 60 being slightly larger to accept the bracket 24. In some forms, the interior of the first end portion 60 contact the exterior of the bracket 24 when installed on the bicycle 22.

In some forms, the interior surface of the first end portion 60 may be generally C-shaped, generally U-shaped, rectangular shaped, and the like. Further, the first end portion may include arms 80, similar to arms 42. Arms 80 may define an interior width $W_A$ of the first end portion 60. To provide for the nesting configuration, the width $W_A$ is just slightly larger than the width $W_B$.

Figure 11:
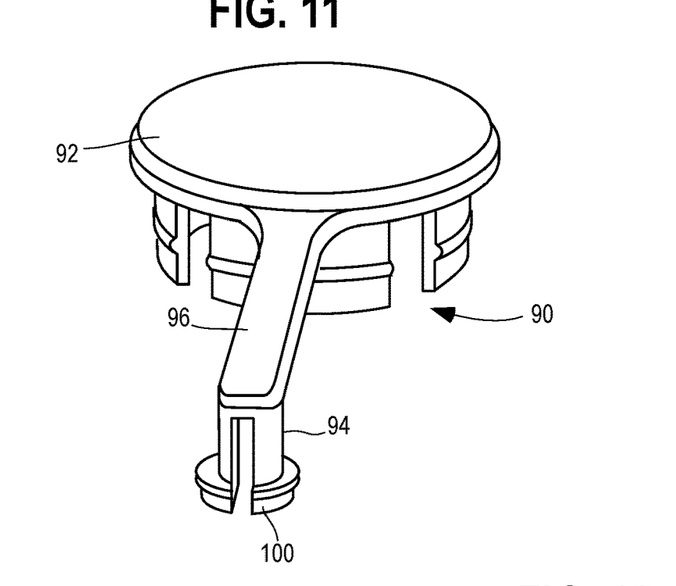
FIG. 11 is a perspective view of a cap.
Figure 12:
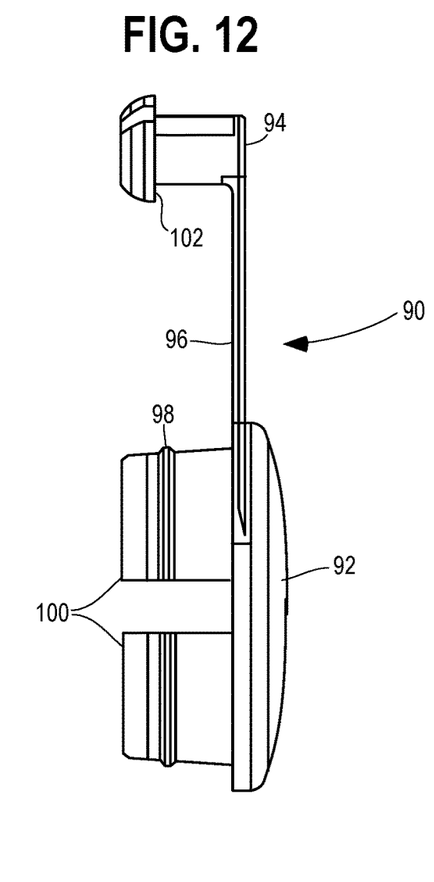
FIG. 12 is a side view of the cap of FIG. 11.

The training wheel system 20 may also include a cap 90 that can be used to cover the opening 64 after the training wheel system 20 is installed on the bicycle. In one form, as shown in FIGS. 11 and 12, the cap 90 includes a cover portion 92 connected to an attachment portion 94 via a connecting portion 96. The cap 90 may also include retention structure, such as a bead 98 and snap features 100 as well as a retaining flange 102. The retention structure can help secure the cover portion 92 in the opening 64 and the attachment portion 94 in an opening 104. The attachment portion 94 can help prevent the cap 90 from being misplaced or lost when the cap 90 is not inserted into or becomes dislodged from the opening 64. The cap 90 may be used to cover the opening 64 to improve the aesthetics of the training wheel system 20, so the opening 64 is not visible after the training wheel arm 26 has been installed. Further, the cap can help prevent debris, a rider's clothing, and other articles from entering the opening 64 after the system 20 is installed.

The training wheel system 20 and its components may be made from a variety of different materials and combinations of materials. In one form, the training wheel arm 26 preferably is rigid and capable of supporting the weight of a rider. Preferably, the training wheel arm 26 is made of a metal, although other materials such as alloys, plastics, carbon fiber, composites, and the like are contemplated. Similarly, the bracket 24, fastener system 28, and other components may be made from similar material. In one form, the cap 90 may be made of any material, such as a plastic material.

The training wheel system 20 may be provided separate from the bicycle 22, such as part of a stand alone kit, or as part of the bicycle. The training wheel system 20 may also come partially or completely assembled on the bicycle 22 when first purchased by a user.

In one form, the training wheel system 20 is partially assembled on the bicycle 22 when first purchased by a user. In this regard, the axle 30 of the bicycle 22 may be secured in a desired position and orientation by a manufacturer using fastener 34. Further, the manufacturer may install the bracket about the axle 30 and retain the bracket 24 using the fastener system 28. The bracket 24 can be positioned such that the protrusion 44 extends into a slot 106 in the bicycle frame. The cooperation of the protrusion 44 and slot can help maintain the orientation of the bracket 24 on the bicycle 22 after installation.

The manufacturer can then ship the training wheel arm 26 with training wheel attached thereto as a separate component from the bicycle 22. In this form, a portion of the training wheel system is preassembled on the bicycle while the bulky components, such as the training wheel arm 26 and training wheel 70 are not installed thereon, permitting less bulky packaging and easier shipping.

Once the bicycle 22 is purchased by the user, the training wheel arm 26 can be quickly an easily installed. In this regard, the training wheel arm 26 is positioned about the axle 30 such that the fastener system 28 is permitted to extend through the opening 64. After the fastener system 28 is through the opening 64, the user can then slide the training wheel arm 26 downwardly such that the axle 30 slides in slot 66 to the desired position. In one form, due to the nesting configuration of the bracket 24 and first end portion 60, the position of the training wheel arm 26 and the bracket 24 can be maintained. Further, as the protrusion 44 maintains the position of the bracket 24 relative to the bicycle 22, the position of the training wheel arm 26 can also be maintained. Once the training wheel arm 26 is in the desired position, the fastener system 28 can be further engaged, such as by tightening against the first end portion 60 outside of the slot 66.

In one form, the bracket 24 can be configured to snap onto the frame about the axle 30. In yet another form, the bracket 24 has hook features that are formed to hook to portions of the frame or axle 30.

As noted above, the cross-sectional profile of the interior surface of the first end portion 60 can generally cooperate with the cross-sectional profile of the exterior surface of the bracket 24. Once installed and the fastener system 28 secured, this aids in preventing the rotation or twisting of the training wheel arm 26.

Overall installation of the system may be simplified by having a portion of the system preinstalled before purchase by a user. In this form, the user simply slots and slides the training wheel arm about the axle and fastener system before finally securing the fastener system, such as by minor rotation a nut to secure the system in place.

The above disclosure refers to a training wheel system for a single side of a bicycle. It should be appreciated that two training wheel systems can be provided such that there are two sets of the above components, one for each side of the bicycle. In one form, each of the training wheel systems used on the bicycle may be identical. According to one form, each of the training wheel systems are mirror images of one another. The training wheel systems can also be configured such that each training wheel system may be used on either side of the bicycle such that the components are generally interchangeable.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are contemplated herein.

What is claimed is:

1. A training wheel system for coupling a training wheel to a bicycle, the system comprising:
    a bracket having a length and an external width, the bracket configured for placement adjacent a frame of the bicycle;
    a training wheel arm having a first end portion and a second end portion, the first end portion configured to couple the training wheel arm to the bicycle and the second end portion configured to couple to a training wheel,
        the first end portion including an interior surface having a width that is larger than and can be positioned about at least a portion of the bracket external width, the first end portion defining a first opening having a first width and an elongated slot extending from the first opening having a second width that is smaller than the first width; and
    a fastener having an outer width, the outer width being smaller than the first width and larger than the second width to permit the first opening to slide over the fastener and retain the first end portion at the elongated slot.

2. The training wheel system of claim 1, wherein the bracket has an exterior surface that is generally U-shaped defined by a base and arms extending therefrom.

3. The training wheel system of claim 2, wherein the bracket further includes a protrusion extending from a portion of one of the arms, the protrusion configured for engaging a slot on a bicycle.

4. The training wheel system of claim 1, wherein the interior surface of the first end portion of the training wheel arm has an interior surface that is generally U-shaped.

5. The training wheel system of claim 1, wherein the fastener includes a flange.

6. The training wheel system of claim 1 further comprising a cap to cover the first opening.

7. The training wheel system of claim 1, wherein the bracket defines an opening to receive an axle of the bicycle.

8. The training wheel system of claim 1, wherein the training wheel arm is configured to be positioned such that at least a portion of the first end portion is located between the bracket and the fastener system.

9. A training wheel system for coupling a training wheel to a bicycle, the system comprising:
    a bracket having a length and an external width, the bracket having at least one arm configured for placement adjacent a frame of the bicycle with a protrusion extending from the at least one arm configured for placement into the frame of the bicycle;

a training wheel arm having a first end portion and a second end portion, the first end portion configured to couple the training wheel arm to the bicycle and the second end portion configured to couple to a training wheel, the first end portion defining an opening including an interior surface having a width that is larger than and can be positioned about at least a portion of the bracket external width such that at least a portion of the bracket is positioned; and a fastener, wherein the first end portion of the training wheel arm defines a first opening having a first width and an elongated slot extending from the first opening having a second width that is smaller than the first width and the fastener has an outer width, the outer width being smaller than the first width and larger than the second width to permit the first opening to slide over the fastener and retain the first end portion at the elongated slot.

10. The training wheel system of claim 9, wherein the bracket has an exterior surface that is generally U-shaped defined by a base and arms extending therefrom.

11. The training wheel system of claim 10, wherein the interior surface of the first end portion of the training wheel arm has an interior surface that is generally U-shaped.

12. The training wheel system of claim 9 further comprising a cap to cover the opening at the first end of the training wheel arm.

13. A method for installing a training wheel arm on an axle of a bicycle comprising the steps of:

providing a bracket having a length and an external width, the bracket configured for placement adjacent a frame of the bicycle, the bracket defining an opening for receiving the axle of the bicycle;

providing a training wheel arm having a first end portion and a second end portion, the first end portion configured to couple the training wheel arm to the bicycle and the second end portion configured to couple to a training wheel, the first end portion including an interior surface having a width that is larger than the bracket external width, the first end portion defining a first opening having a first width and an elongated slot extending from the first opening having a second width that is smaller than the first width;

providing a fastener on the axle of the bicycle, the fastener having an outer width, the outer width being smaller than the first width and larger than the second width;

positioning the training wheel arm about the bracket whereby the fastener is permitted to pass through the first opening; and moving the training wheel arm such that the axle slides from the first opening to the elongated slot.

14. The method of claim 13 further comprising the step of tightening the fastener system against the training wheel arm.

\* \* \* \* \*